United States Patent
Wang et al.

(10) Patent No.: US 7,882,245 B2
(45) Date of Patent: Feb. 1, 2011

(54) PRESENCE SERVICE ACCESS DEVICE, PRESENCE SERVICE SYSTEM AND METHOD FOR PUBLISHING AND ACQUIRING PRESENCE INFORMATION

(75) Inventors: Jun Wang, Shenzhen (CN); Ning Ma, Shenzhen (CN); Qian Sun, Shenzhen (CN); Yang Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 246 days.

(21) Appl. No.: 12/197,101

(22) Filed: Aug. 22, 2008

(65) Prior Publication Data
US 2008/0313329 A1    Dec. 18, 2008

Related U.S. Application Data (63) Continuation of application No. PCT/CN2006/002811, filed on Oct. 20, 2006.

(30) Foreign Application Priority Data

Feb. 25, 2006    (CN)    .................... 2006 1 0033962

(51) Int. Cl.
*G06F 15/16* (2006.01)
(52) U.S. Cl. .................. 709/227; 709/206; 709/224
(58) Field of Classification Search ............... 709/206, 709/224, 227
See application file for complete search history.

(56) References Cited

U.S. PATENT DOCUMENTS

| | | | |
|---|---|---|---|
| 6,058,168 A | 5/2000 | Braband | |
| 6,757,722 B2 * | 6/2004 | Lonnfors et al. | 709/220 |
| 7,302,270 B1 * | 11/2007 | Day | 455/456.1 |
| 7,328,046 B2 | 2/2008 | Koskelainen et al. | |
| 7,412,522 B2 * | 8/2008 | Liscano et al. | 709/227 |
| 7,571,207 B2 * | 8/2009 | Yoshizawa et al. | 709/203 |
| 7,702,726 B1 * | 4/2010 | Grabelsky et al. | 709/204 |
| 2002/0078150 A1 * | 6/2002 | Thompson et al. | 709/204 |
| 2003/0105820 A1 * | 6/2003 | Haims et al. | 709/205 |
| 2004/0003046 A1 * | 1/2004 | Grabelsky et al. | 709/206 |
| 2005/0216848 A1 * | 9/2005 | Thompson et al. | 715/753 |

(Continued)

FOREIGN PATENT DOCUMENTS

CN    1208527 A    2/1999

(Continued)

*Primary Examiner*—Phuoc Nguyen
(74) *Attorney, Agent, or Firm*—Leydig, Voit & Mayer, Ltd.

(57) ABSTRACT

A presence service access device is disclosed for a presentity to publish presence information and transmit said information to the presence server, the device comprising a presentity communication module and a service scheduling control module. Further disclosed is a presence service system using the presence service access device, comprising a presentity, a presence service access device, a presence server, and a watcher client. Also disclosed is a method of publishing and acquiring presence information comprising steps of: 1. a presentity which publishes presence information; 2. the presence service access device which receives the presence information published by the presentity and forwards the same to a presence server; and 3. the presence server which distributes the presence information to corresponding watcher client. According to the present invention, various presentities provide presence information to watcher clients by connecting presence servers through a presence service access device.

10 Claims, 3 Drawing Sheets

U.S. PATENT DOCUMENTS

| | | |
|---|---|---|
| 2005/0228895 A1 | 10/2005 | Karunamurthy et al. |
| 2005/0251557 A1* | 11/2005 | Yoshizawa et al. .......... 709/206 |
| 2006/0047782 A1* | 3/2006 | Niemi ........................ 709/220 |
| 2006/0123082 A1* | 6/2006 | Digate et al. ................ 709/205 |
| 2008/0208982 A1* | 8/2008 | Morris ....................... 709/206 |

FOREIGN PATENT DOCUMENTS

| | | |
|---|---|---|
| CN | 1526253 A | 9/2004 |
| WO | WO 2005/022863 A1 | 3/2005 |
| WO | WO 2005/096592 A1 | 10/2005 |

* cited by examiner

PRESENCE SERVICE ACCESS DEVICE, PRESENCE SERVICE SYSTEM AND METHOD FOR PUBLISHING AND ACQUIRING PRESENCE INFORMATION

CROSS-REFERENCE TO RELATED APPLICATION

This application is a continuation of International Patent Application No. PCT/CN2006/002811, filed Oct. 20, 2006, which claims priority to Chinese Patent Application No. 200610033962.2, filed Feb. 25, 2006, each of which is hereby incorporated by reference in its entirety.

FIELD OF THE INVENTION

The present invention relates to implementation of presence service of the internet field and the wireless communication field, and particularly, to a system and a method for publishing and acquiring presence information. In addition, the present invention relates to a presence service access device.

BACKGROUND

A presence service is also referred to an existence service, which is a communication service for collecting and distributing presence information. At present, the presence service is usually provided together with an instant message service. Alternatively, the presence service may also be provided independently, or in conjunction with other services, such as network game services. Standard specifications related to presence services have been worked out preliminarily by international standard organizations, such as Internet Engineering Task Force (IETF) and Open Mobile Alliance (OMA), and are now being perfected continually. The present invention mainly uses terms in RFC 2778, and calls an entity or user providing presence information to the presence service as a presentity and an entity or user requesting presence information from the presence service as a watcher. A user of the presence service may be a natural person or a non-natural person, i.e. the presentity and watcher both may correspond to natural persons or non-natural persons. In addition to basic information such as online/offline status and communication mode of the presentity, the presence information also includes extended information such as mood, location, and activity; and value-added service information provided by the non-natural person such as weather forecasting, station, or TV program, and traffic movement. Relevant standard drafts released by IETF and OMA are at present for the natural person and no study is carried out for publishing of presence information of the non-natural person, and presence information of the non-natural person is not provided in instant message service already placed into the commercial application. In fact, the publishing of presence information of the non-natural person differs greatly from that of the natural person.

Figure 1:
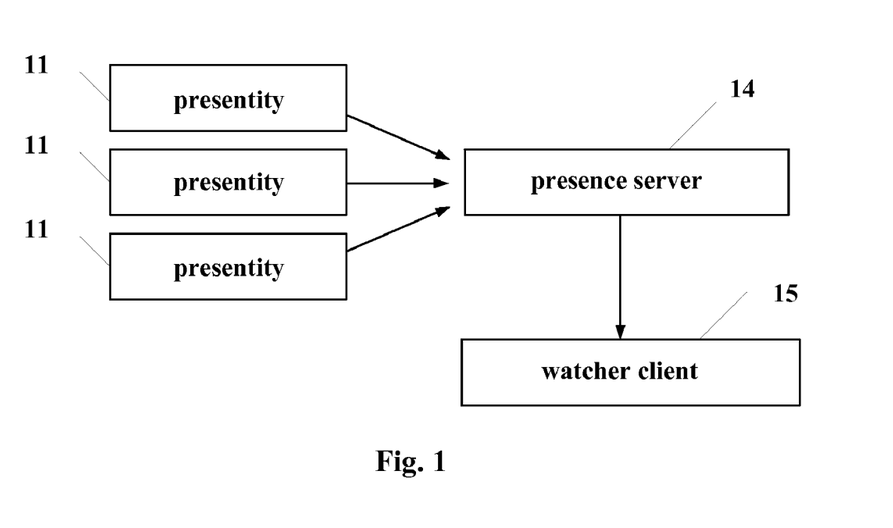
FIG. 1 shows a schematic diagram of a related art presence service system.

An architecture diagram of an existing presence service system is shown in FIG. 1, in which natural person presentities 11, 12, and 13 directly publish respective presence information to a presence server 14 and the presence server distributes these presence information to corresponding watcher clients 15. If the non-natural person presentity is directly connected with a certain presence server and the presence server directly distributes presence information to watcher clients over a SIP/IP (Session initiation protocol/Internet Protocol) core network, when the amount of information service traffic of the non-natural person presentity is large, all presence information is forwarded by the presence server directly connected therewith, which would exert an extreme large load on the presence server and is difficult to meet the requirements of service development. Moreover, since, in general, it is the presence server of a user's home that is responsible for forwarding of user presence service information, if this presence server is not connected with the non-natural person presentity providing service, when the user acquires presence information with a one-time subscription, the subscription request message will not be sent to the non-natural person presentity. Further, for different non-natural person presentities, such as radio station presentity and transportation information presentity, formats of provided presence information contents are different and it is difficult to abstract a data model similar to that of the natural person to describe presence information of the non-natural person generally. In addition, information provided by the non-natural person presentity to a watcher client is usually charged and rates are usually different for information provided by different non-natural persons. The above differences make it difficult to similarly process presence information of the non-natural person in the same manner as that of the natural person. Therefore, with development of the presence service for the forwarding of information type presence information, the user's presence information should be transmitted by the presence server of the user's home. However, the main problems required to be resolved for development of the presence service are how to access numerous kinds of non-natural person presentities to presence servers everywhere and how to ensure conformity and security of the access to separate access and control of the presence service.

SUMMARY OF THE INVENTION

An object of the present invention encompasses providing a presence service access device capable of receiving presence information transmitted by a presentity and forwarding the presence information to a corresponding presence server, according to a correspondence relationship between presentities and presence servers.

Another object of the present invention encompasses providing a presence service system which receives presence information transmitted by a presentity through a presence service access device and transmits the presence information to a corresponding presence server, which forwards the presence information to a watcher client that has subscribed the presence information, thereby enabling the watcher client to obtain the subscribed information in the presence service.

Another object of the present invention encompasses providing a method for publishing and acquiring presence information, in which a presentity transmits presence information to a presence service access device, the presence service access device transmits the presence information to a corresponding presence server, and the presence server transmits the received presence information to the watcher client.

The objects of the present invention are achieved by the following solutions.

The present invention provides a presence service access device for accessing a presentity into a presence server, comprising: a presentity communication module configured to detect whether presence information from the presentity matches a predefined mode definition; and a service scheduling control module configured to distribute the presence information to the presence server based on a correspondence relationship between presentities and presence servers.

Further, the presence service access device further includes: a connection control module which communicates with the presentity communication module, configured to perform identity authentication for the presentity which transmits the presence information to the connection control module, and forwards the presence information published by the presentity which passes the identity authentication to the presentity communication module; and a presence server communication module which communicates with the scheduling control module and the presence server, respectively, configured to perform traffic control over the presence information distributed by the service scheduling control module to the presence server based on service volume.

Further, the presence service access device further includes: a connection control module which communicates with the presentity communication module, configured to perform identity authentication for the presentity which transmits the presence information to the connection control module, and forwards the presence information published by the presentity which passes the identity authentication to the presentity communication module.

Further, the presence service access device further includes: a management information base configured to store system data, the stored data being called by modules in the presence service access device; and a system management module configured to perform service management and system control for the presence service access device and maintain the data stored in the management information base. The service management includes completing statistical reports of service, generating reports, system additions, modifying and deleting related data; and the system monitoring includes monitoring, inquiring, operating, and maintaining of the presence service access device.

The presence service access device further includes: a protocol conversion module configured to perform communication protocol conversion when the presentity communication module or the presence server communication module receives and distributes the presence information.

The present invention further provides a presence service system including: a presentity configured to transmit presence information to a presence service access device; a presence service access device configured to receive the presence information published by the presentity and transmit the presence information to a presence server; a presence server configured to receive and store the presence information transmitted by the presence service access device and distribute the presence information to a watcher client; and a watcher client configured to receive the presence information distributed by the presence server.

The system further includes a charging processing module configured to receive a confirmation information returned by the presence server after publishing the presence information, generate an original call detail record and a charging record of the presence service based on the confirmation information, and transmit a charging file to a charging center. The charging processing module is directly provided in the presence server or in the presence service access device and is communicated with the presence server communication module.

Further, the system further includes: a tandem device configured to interconnect presence service access devices in the presence service system and store routing information; the presence information being forwarded among the presence service access devices based on the routing information.

The present invention further provides a method for publishing and acquiring presence information including: A. publishing, via a presentity, presence information to a presence service access device; B. receiving and forwarding, via the presence service access device, the presence information to a presence server; and C. distributing, via the presence server, the presence information to a corresponding watcher client.

Further, the step B further includes: B1. receiving, via the presence service access device, the presence information; B2. verifying, via the presence service access device, the presence information based on a predefined mode definition; and B3. transmitting, via the presence service access device, the presence information passing the verification to the presence server.

Subsequent to step B1, the method further includes a step of performing, via the presence service access device, identity authentication for the presentity which publishes the presence information.

Prior to step B3, the method further includes: B11. acquiring, via the presence service access device, routing information from a tandem device; and B12. forwarding, based on the routing information, the presence information to the presence service access device corresponding to the presence server to which the watcher clients receiving the presence information belong.

Further, the routing information mentioned in the step B1 includes a subscription relationship between watchers and presentities, an ascription relationship between watchers, and presence servers and data of correspondence relationship between presence servers and presence service access devices.

The step B12 includes: determining a corresponding watcher which subscribes to the published presence information of the presentity based on the subscription relationship; determining a corresponding presence server based on the determined watcher, and the ascription relationship between watchers and presence servers; and determining a corresponding presence service access device based on the determined presence server and the data of the correspondence relationship between presence servers and presence service access devices.

Alternatively, the routing information mentioned in step B1 includes a correspondence relationship between presence servers and presentities for denoting that there is at least one watcher belonging to the presence server which subscribes to the presence information of the presentity, and a correspondence relationship between presence servers and presence service access devices.

The step B12 includes: determining a presence server to which the corresponding watcher which subscribes to the presentity publishing the presence information belongs based on the correspondence relationship between presence servers and presentities; and determining a corresponding presence service access device based on the determined presence server and the correspondence relationship between presence servers and presence service access devices.

Further, the method further includes generating an original call detail record, and transmitting the original call detail record to a charging center after successful information transmission.

Further, the process of generating an original call detail record subsequent to successful information transmission is defined as follows: the presence server returns to the presence service access device a response message including a list of watchers of successful transmission or unsuccessful transmission after successful transmission of the presence information to the watcher client, and the presence service access device generates an original call detail record based on the received message.

Therefore, according to the present invention, the presence information published by the presentity may be transmitted to the presence server by the presence service access device, and the presence information is transmitted to the corresponding watcher client by the presence server, hence, realizing the publishing of presence information in the presence service. In the present invention, separating access and control of the presence service enables the presence server to mainly conduct distribution of the presence information, which reduces the load of the presence server and enhances the efficiency and security with which the presence server processes the presence information.

DETAILED DESCRIPTION

Embodiments of the present invention are described below with reference to the accompanying drawings, in order to enable those skilled in the art understand and implement the present invention.

The presence service access device provided in this embodiment, which includes a presentity communication module and a service scheduling control module, is communicated with a presentity and a presence server. The presentity communication module detects whether received presence information matches predefined mode definition. The service scheduling control module distributes the presence information to the presence server according to a correspondence table between presentity clients and presence servers.

Figure 2:
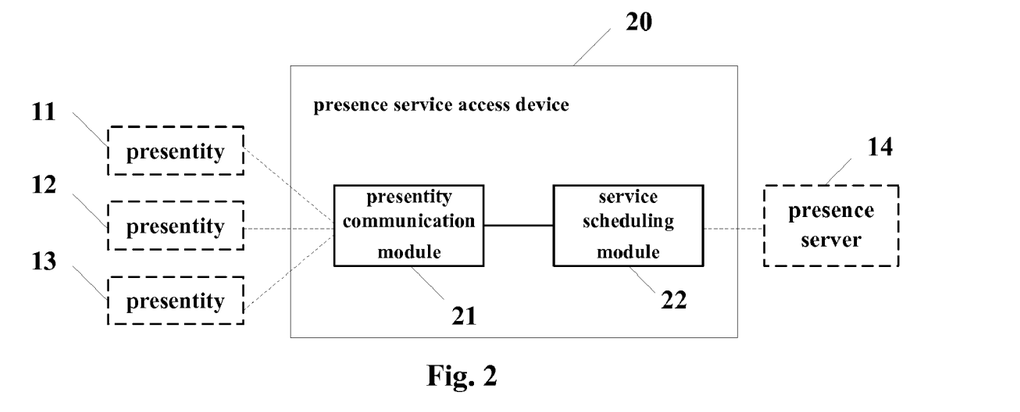
FIG. 2 shows a schematic diagram of the presence service access device according to a first embodiment of the present invention.

Referring to FIG. 2, which illustrates a functional block diagram of the presence service access device according to a first embodiment of the present invention:

A presence service access device 20 of the present embodiment connects presentities 11, 12, and 13 to a presence server 14. The device mainly includes a presentity communication module 21 and a service scheduling control module 22. The presentity communication module 21 detects whether presence information from a presentity matches a predefined mode definition, and delivers the presence information matching the mode definition to the service scheduling control module 22, which distributes the presence information to the presence server 14 according to a correspondence relationship between the presentities and the presence servers.

Figure 3:
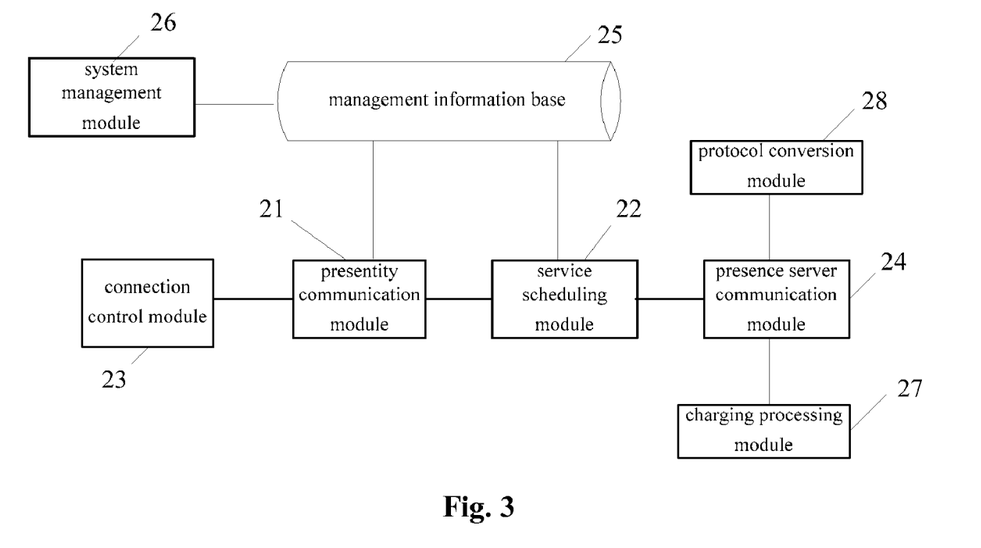
FIG. 3 shows a schematic diagram of the presence service access device according to a second embodiment of the present invention.

FIG. 3 is a schematic diagram illustrating the presence service access device according to an extended embodiment of the present invention. As defined in FIG. 3, a connection control module 23 located in the presence service access device performs identity authentication for a presentity client, which transmits the presence information to the presence service access device and creates log records for the received presence information. A presence server communication module 24 may dynamically control transmission traffic of the presence information according to service volume. A management information base 25 centrally stores various system data, and a system management module 26 is used for service management and system monitoring and maintains data stored in the management information base. A charging processing module 27 may also be provided in the presence service access device to generate an original call detail record based on the received information returned by the presence server, record information relating to presence information received by the watcher client, such as IDs of presentities and watchers (e.g. universal resource identifier URI and telephone numbers), receive time, and provide the information to a charging center in the system, which calculates service fees of a watcher user based on the information and rates.

To ensure that the presence service access device accesses presentities supporting different protocols to different presence servers, a protocol conversion module 28 is also provided in the device of the present invention, which communicates with the presentity communication module or the presence server communication module and performs communication protocol conversion when the presentity communication module or the presence server communication module receives and distributes the presence information. In this embodiment, the protocol conversion module 28 is communicated with the presence server communication module 24.

Figure 4:
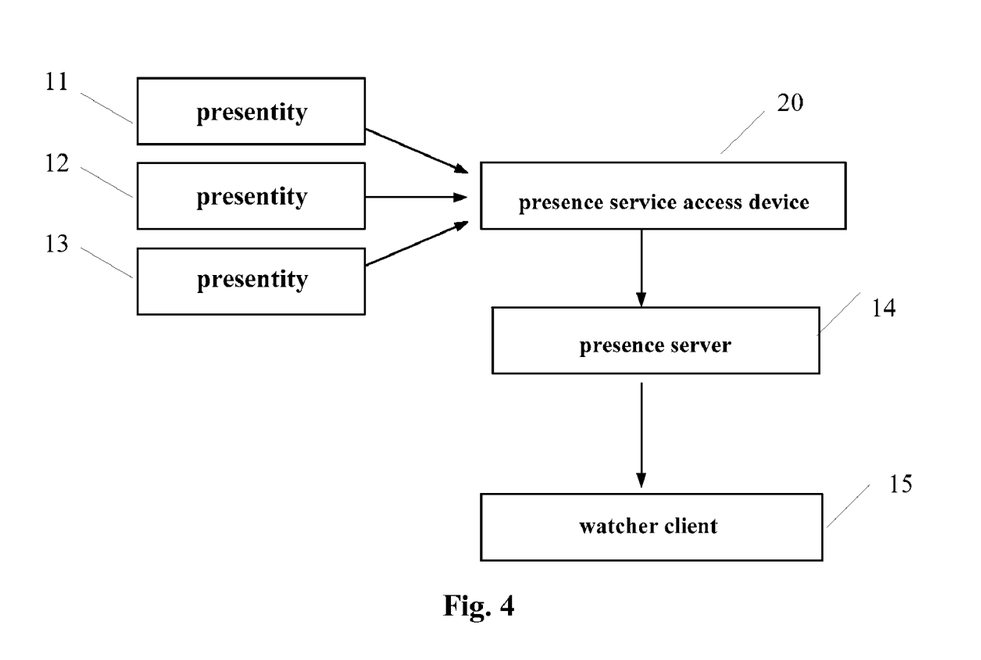
FIG. 4 shows a schematic diagram of the presence service system according to an embodiment of the present invention.

Compared with the device of the first embodiment of the present invention illustrated in FIG. 2, the modules added in this embodiment may be arbitrarily selected according to practical application requirements. The present invention also provides a presence service system employing the above-mentioned presence service access device. As shown in FIG. 4 in this embodiment, the presence service system of the present invention includes presentities 11, 12, and 13; a presence service access device 20; a presence server 14; and a watcher client 15. The presence service system according to the present invention will be described with reference to FIG. 4.

The presentities are communicated with the presence service access device and publish the presence information to the presence service access device. The presentities include natural person presentity and non-natural person presentity; and, in general, the non-natural person presentity is an application server of a service provider (SP). The presence information may be text presence information, multimedia presence information or links related to the presence information. The presentities may transmit the presence information to the presence service access device. The presence service access device conducts identity authentication for presentities which transmit the presence information, detects received presence information, and forwards the presence information to the presence server based on a watcher subscription list.

The presence server receives, stores the presence information transmitted by the presence service access device, and distributes the presence information to the watcher client.

The watcher client encompasses a watcher and a watcher user agent. The watcher user agent is a platform for interaction between the watcher user and the system. The watcher receives the presence information of presentity transmitted from the presence server. The watcher of the watcher client may be classified as an inquirer or a subscriber. The inquirer only requests to inquire user information of a presentity user, and the subscriber may receive timely updated presence information by means of subscription when the user information of the presentity user changes.

The presence service system and the presence service access device of the present invention will be described with reference to the following embodiments.

A presentity publishes presence information to the presence service access device via a presence protocol, such as session initiation protocol (SIP). The SIP PUBLISH message includes universal resource identifier (URI) of the presentity and the presence information in XML format. The presence service access device may store in advance a list of IP addresses or URI identifications of presentities whose access are allowed, and check whether the IP address or URI identification of the presentity transmitting the message is in the list when receiving the message. If the IP address or URI identification of the presentity transmitting the message is in the list, the presence service access device allows the access or otherwise rejects the access. In order to control publishing of the presentity information to the presence service access device, a publishing authorization rule strategy may be stored in the presence service access device. The presence service access device receives the presence information based on authorization rules and may configure the authorization rules with extendable marker language, e.g. specifies URI of a presentity authorized to publish by using a sub-element contained in the "identity" element:

<identity><id entity="user@example.com"/></identity>

The presentity containing the above URI as "user@example.com" has the right to publish presence information to the presence service access device. There may be a plurality of URIs to form an authorization list.

The XML files of the authorization rule strategy, such as the authorization list, are stored in the presence service access device. After the presence information is received and the connection control module conducts identity authentication according to the authorization list, the presentity communication module may detect whether the received presence information matches a predefined XML mode definition. Since formats of different non-natural person presentity information are different, there is at least one predefined XML Schema file for the presence information of each type of non-natural person presentity. By storing in advance the XML Schema files of non-natural person presentities in the presence service access device and detecting the presence information, the presence server no longer needs to detect whether the presence information matches the predefined format, hence, effectively reducing the load of the presence server. Specifically, in the message content of the presence information published by the presentity, the attribute "xmlns" of the "presence" element wherein may specify the name space used by the presence information of the presentity, i.e. the corresponding XML Schema by which the presentity communication module verifies the presence information. In addition, a tag element with a default value of 0 may also be provided in the presence information message and the value of the tag element is set to 1 after verification of the presentity communication module is passed. Then, when the presence service access device forwards the presence information to the presence server, and the presence server detects that the value of the tag element in the presence information is 1, no authentication is conducted. If some presentities, such as natural person presentities, publish presence information without going through the presence service access device, the presence server also needs to authenticate the published presence information.

Figure 5:
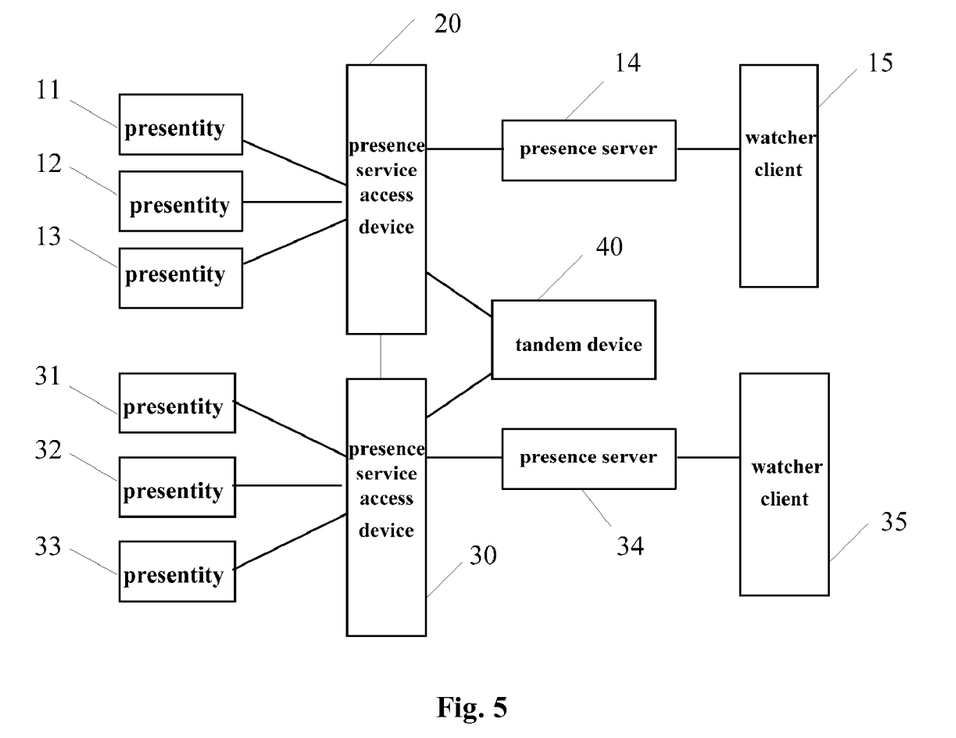
FIG. 5 shows a schematic diagram of the presence service system, including a tandem device, according to an embodiment of the present invention.

Since there may be multiple presence service access devices, as shown in FIG. 5, the presence service access device 20 accesses presentities 11, 12, and 13 to the presence server 14; and the presence server 14 receives and stores presence information transmitted by the presence service access device 20 and distributes the presence information to the watcher client 15. Similarly, the presence service access device 30 accesses presentities 31, 32, and 33 to the presence server 34; and the presence server 34 receives and stores presence information transmitted by the presence service access device 30 and distributes the presence information to the watcher client 35.

In case there are multiple presence service access devices in the presence service system, the presence service access devices are connected each other via a tandem device 40. The subscription relationship between watchers and presentities may be stored in the tandem device 40. According to an adscription relationship between watchers and presence servers, routing information such as correspondence relationships between presence service access devices and presence servers, such as tables of the correspondence relationships between the presence servers, the watcher user identifiers (such as handset numbers, SIP URIs) non-natural person presentity identifiers (such as IP addresses, SIP URIs); the presence service access devices 20 and 30 perform route inquiry and route updates through the tandem device; each of the presence service access devices buffers the inquired route information locally; and the tandem device also may distribute updated route information to each of the presence service access devices. Forwarding of the presence information may be performed between the presence service access devices based on TCP/IP protocol.

The specific procedure is as follows: a presentity publishes presence information to a presence service access device to which the presentity belongs; the presence service access device to which the presentity belongs inquires the route information from the tandem device or inquires the locally buffered route information, and determines which watchers subscribe the presence information according to the subscription relationship; then the presence service access device determines which presence servers to be forwarded the presence information based on the adscription relationship between watchers and presence servers; and then determines which presence service access devices to be forwarded the presence information based on the correspondence relationship between presence service access devices and presence servers; and when a presence service access device receives the forwarded presence information, the presence service access device distributes the presence information to watcher clients which subscribe the presence information via a corresponding presence server. For simplifying the procedure, the presence service access device to which the presentity belongs may transmit the presence information to all other connected presence service access devices to which the presence service access device is connected, and then each presence service access device transmits the presence information to all presence servers to which that presence service access device is connected. If the presence servers inquire that no watcher has subscribed the presence information of the presentity, the presence information will not be transmitted, otherwise the presence information will be transmitted. Since the presence information provided by non-natural person presentities generally is value-added service information, in general, there are some watcher users on each presence server which subscribes to the information, and therefore this method is reasonable. In the above-mentioned routing method, the subscription relationship between watchers and presentities needs to be stored in the tandem device. In practice, data of the subscription relationship is relatively much. In the prior art, the data is already stored in the presence server to enable the presence server to distribute the presence information. It can be seen from the above routing process that in practice in which the entire data of the subscription relationship between watchers and presentities is not required and only the correspondence relationship between the presentity and the presence servers to which the watcher subscribing the presence information of the presentity belongs is required. Data of the correspondence relationship is relatively small, so the retrieval speed is fast and frequently updating is not required. For example, if a watcher on a presence server subscribes presence information of a presentity and another watcher that belongs to the same presence server also subscribes the presence information of the same presentity, updating of the above-mentioned data of the correspondence relationship is not required.

To enhance security, restrictive conditions for the presentity to publish presence information, such as upper limit of publishing frequencies, publishing time, and upper limit of the number of published messages, may also be set in advance. When the presence service access device receives the SIP PUBLISH message, it first checks whether the message meets the restrictive conditions. The restrictive conditions are stored in an allowing access list, as shown in Table 1:

TABLE 1

| Presentity | description | Publishing frequencies | Publishing time | Number of published messages |
|---|---|---|---|---|
| IP:10.10.10.1 | Transportation information | 1 piece/minute | | |
| SIP URI:stock @ Nasdaq.com | Stock information | 1 piece/second | From 9:00 to 16:00 | |
| IP:10.10.10.2 | Weather forecasting | | From 7:00 to 8:00 | 10 pieces/day |

To use the above restrictive conditions, such as the publishing frequencies or the number of published messages, the connection control module creates log records for the received presence information to record the successful receiving time of each message, the presentity transmits the presence information and relevant information of the presence information, calculates the actual publishing frequency and the number according to the log record, and then checks whether they meet the predefined restrictive conditions.

The presence service access device forwards the presence information, which meets the predefined mode definition, to the presence servers. The presence servers processing natural person presence information, and the presence servers processing non-natural person presence information, may be configured separately to enable the system processing to be simpler and more efficient.

In addition, a presence server communication module may be included in the presence service access device for performing dynamic control on transmission traffic based on service volume. The presence server communication module dynamically adjusts message traffic transmitted to the presence servers, according to the service volume of the presence servers reported by the presence servers, in order to limit the load on the presence servers, which may excessively overwhelm the system. Alternatively, different presentities may be configured with priorities in advance and the presence information published based on orders of the priorities. Waiting time and priority are considered at the same time, e.g. multiplication of the waiting time and the priority is used to measure publishing order of the presence information.

A management information base module may be included in the presence service access device for centrally storing various system data, such as the above mentioned allowing access list, extendable marker language definition XML Schema of non-natural person, table of correspondence relationship between non-natural person presentities and presence servers, and records of receiving and transmitting the presence information. The system data is also provided to modules in the system for use. A system management module may also be added for performing service management and system monitoring and maintaining data stored in the management information base. The service management mainly includes completing statistical reports of service, generating reports, system additions, modifying and deleting related configuration data such as above mentioned allowing access lists, XML Schema of non-natural persons and table of correspondence relationships between non-natural person presentities and presence servers. The system monitoring mainly includes completing management on the monitoring, inquiry, operation, and maintenance of the presence service access device, such as displaying and monitoring current system processing load and alarming upon detecting that the load exceeds a certain load value.

In addition, a protocol conversion module is included in the presence service access device for implementing protocol conversion between communication modules connecting the presence server and the presentity. The SIP protocol may be used for communication between the presentity and the presence service access device, while the TCP/IP protocol may be used for communication between the presence service access device and the presence server. The protocol conversion module may convert received SIP messages into corresponding TCP/IP protocol messages and then transmit them.

The presence server receives the presence information and distributes the presence information to corresponding watcher client according to the watcher subscription list. The presence server first stores the received presence information, and then inquires the list of watchers who subscribed to the presence information, and transmits new presence information to the corresponding watcher client via the SIP NOTIFY message.

Since the presence service of the natural person generally is not charged and the value-added service information provided by the non-natural person presentities generally is charged, a charging processing module may be included in the presence service access device for generating original call detail record (CDR) of the presence service, the charging record interacting with the charging center to transmit charging files to the charging center via FTP protocol. Specifically, the following two manners may be used for implementation:

The first charging manner: a charging processing module is provided in the presence service access device. Since the presence information transmitted by the presentity does not include information on watchers, i.e. the presence service access device cannot determine which watcher clients are to receive the presence information, after the presence service access device transmits the presence information to the presence server, the presence server distributes the presence information according to the list of watchers which subscribe to the presence information. After completing the distribution, the presence server returns a publishing confirmation message, which includes a list of watchers to which the presence information was transmitted successfully. The charging processing module of the presence service access device generates an original call detail record that records information on watcher clients receiving the presence information, such as presentity identifier URI and receiving time, and provides the information to the charging center which calculates service fees of the watcher users according to this information and rates. Of course, although the presence service access device cannot determine which watcher clients are to receive the presence information, it can determine which watcher clients the presence server will transmit the presence information according to the subscription relationship between watchers and presentities stored in the tandem device. Thus, the presence server only needs to return a list of the presence information watchers which received transmission failures to the presence service access device after completing the transmission of the presence information, and the data volume of this list is much less than that of the list of watchers of successfully transmitted presence information. The presence service access device generates no charging record for watchers of transmission failure.

The second charging manner is illustrated as follows: since the charging processing module is provided in the presence service access device, the presence service access device can only conduct charging after the presence server returns a watcher list to it regardless of success or failure. This leads to low processing efficiency. The charging processing module may be provided directly in the presence server, and generates the original call detail record according to the process of presence information distribution to watcher clients. For the frequently published presence information, charging may be done via the presence server. Alternatively, a monthly charging method may be employed to simplify charging processing, e.g. a monthly or daily charging method may be used for stock information for which updated presence information is frequently published.

With the above-mentioned presence service system, the present invention further provides a method for publishing and acquiring presence information, which encompasses the following basic idea: the presentity publishes the presence information on the presence service access device; the presence service access device performs identity authentication for the presentity, detects whether the received presence information matches a predefined mode definition, and transmits the presence information which matches the mode definition to the presence server, according to corresponding watcher subscription list; and the presence server transmits the presence information to corresponding watcher clients. A detailed description of the present invention will be provided hereinafter with reference to FIG. 6.

Figure 6:
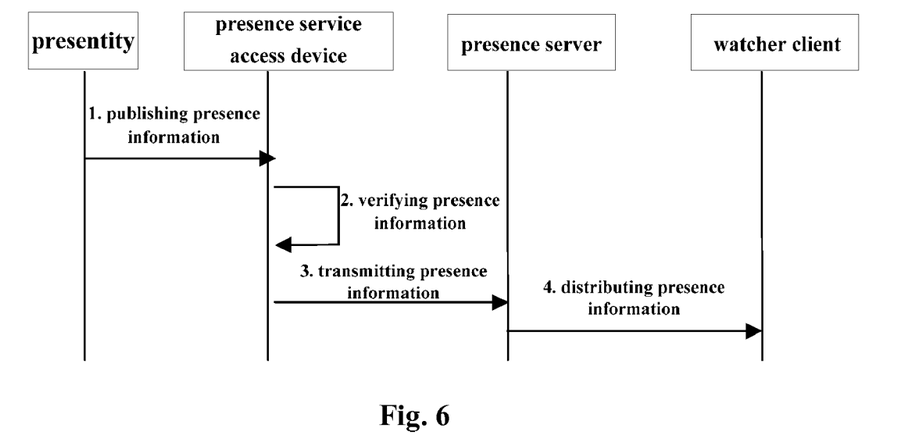
FIG. 6 shows a flowchart for implementation of the method according to an embodiment of the present invention.

As shown in FIG. 6, the method according to an embodiment of the present invention includes the following steps:

1. The presentity publishes the presence information to the presence service access device;

2. The presence service access device receives the presence information, performs identity authentication for the presentity which publishes the presence information, and detects whether the received presence information matches a predefined mode definition;

3. The presence service access device transmits the presence information to the presence server; and 4. The presence server distributes the presence information to corresponding watcher clients according to a watcher subscription list.

An example of the method according to the present invention will be described in detail hereinafter.

The presentity publishes the presence information to the presence service access device. The presence service access device performs identity authentication for the presentity which publishes the presence information, and transmits the presence information which matches the mode definition to the presence server. The presence server distributes the presence information to watcher clients according to corresponding subscription relationships. The specific processing procedure of publishing and receiving of the presence information is as follows:

101. The presentity publishes presence information to the presence service access device via a presence protocol. The presence information includes text presence information, multimedia presence information, or links related to the presence information.

201. The presence service access device receives the presence information. The SIP protocol may be used for communication between the presentity and the presence service access device, to perform identity authentication for the presentity which publishes the presence information. It checks whether the IP address or URI identifier of the presentity which publishes the presence information is in the list; if the IP address or URI identifier of the presentity which publishes the presence information is in the list, the access is allowed; otherwise, the access is rejected.

Because there may be a plurality of presence service access devices and presence servers in the system, assuming that a plurality of presence service access devices and presence servers access the system, the presence service access devices are connected through a tandem device. In this step, the presence service access device needs to acquire route information from the tandem device and forward the presence information to the presence service access device corresponding to the presence server to which the watcher client which receives said presence information belongs, according to the table of corresponding relationships among presentities, presence servers, presence service access devices, and watchers in the route information.

202. The presence service access device detects whether the received presence information matches the predefined mode definition.

203. The presence service access device transmits the presence information to the presence server.

In this step, the presence service access device may further dynamically adjust the message traffic transmitted to the presence server, according to the service volume reported to the presence server by the presence server, to avoid excess processing load on the presence server. Alternatively, different presentities may be configured with priorities, and presence information is published in orders of the priorities. Waiting time and priority are also considered at the same time, e.g. the multiplication of them is used to measure the order of publishing the presence information.

If the presence service access device and the presence server communicate directly via TCP/IP protocol, this step further includes converting the received SIP message into corresponding TCP/IP protocol message and then transmitting it.

301. The presence server stores the received presence information transmitted by the presence service access device.

302. The presence server inquires the list of watchers which subscribe the presence information, and transmits the presence information to corresponding watcher clients via the SIP NOTIFY messages.

If the presence service involves value-added services of charging, there are two methods after this step:

The first method is as follows: the charging processing module may be provided directly in the presence server, and generates original call detail records according to the situation of distributing the presence information to watcher clients.

The second method is as follows: the charging processing module is provided in the presence service access device, and then the following steps are carried out:

303. After completing the distribution, the presence server returns to the presence service access device a publishing confirmation message, which includes a list of watchers to which the presence information is transmitted successfully.

304. The charging processing module of the presence service access device generates the original call detail records for recording information on the presence information received by the watcher clients, such as presentity identifier URI and receiving time according to the received information, and provides the records to the charging center.

305. The charging center calculates service fees of watcher users according to the information and rates.

While the present invention is described with reference to embodiments thereof, those skilled in the art will understand that various modifications and variations may be made to the present invention without departing from the spirit and essence of the present invention. Therefore, the scope of the present invention is defined by the appended claims.

What is claimed is:

1. A presence service system comprising:
a presence service access device, a presence server, and a charging processing module;
wherein the presence service access device is configured to:
receive presence information published by a presentity;
verify the presence information based on a predefined mode definition;
acquire routing information from a tandem device, wherein the routing information comprises a subscription relationship between watchers and presentities, an ascription relationship between watchers and presence servers, and data of correspondence relationship between presence servers and presence service access devices;
determine a corresponding watcher, which subscribes the published presence information of the presentity, based on the subscription relationship;
determine a corresponding presence server based on the determined watcher and the ascription relationship between watchers and presence servers;
determine a corresponding presence service access device based on the determined presence server and the data of the correspondence relationship between presence servers and presence service access devices;
forward the presence information to the determined presence service access device, wherein the determined presence service access device is configured to transmit the presence information passing the verification to the determined presence server;
wherein the presence server is configured to receive and store the presence information transmitted by the presence service access device and distribute the presence information to a watcher client; and
wherein the charging processing module is configured to receive confirmation information returned by the presence server subsequent to publishing the presence information, generate an original call detail record and a charging record of the presence service based on the confirmation information, and transmit a charging file to a charging center.

2. The system of claim 1, further comprising:
the tandem device configured to interconnect presence service access devices in the presence service system and store presence routing information, the presence information being forwarded among the presence service access devices based on the routing information.

3. A method for publishing and acquiring presence information, comprising the following steps:
receiving, via a presence service access device, the presence information;
verifying, via the presence service access device, the presence information based on a predefined mode definition;
acquiring, via the presence service access device, routing information from a tandem device, wherein the routing information comprises a subscription relationship between watchers and presentities, an ascription relationship between watchers and presence servers, and data of correspondence relationship between presence servers and presence service access devices;
determining a corresponding watcher, which subscribes the published presence information of the presentity, based on the subscription relationship;
determining a corresponding presence server based on the determined watcher and the ascription relationship between watchers and presence servers;
determining a corresponding presence service access device based on the determined presence server and the data of the correspondence relationship between presence servers and presence service access devices;
forwarding the presence information to the determined presence service access device;
transmitting, via the determined presence service access device, the presence information passing the verification to the determined presence server;
distributing, via the determined presence server, the presence information to a corresponding watcher client;
generating charging information in which the presence server generates an original call detail record; and
transmitting the original call detail record to a charging center after successful information transmission.

4. The method of claim 3, wherein the method further comprises a step of performing, via the presence service access device, identity authentication for the presentity which publishes the presence information.

5. The method of claim 3, wherein the method further comprises a step of generating charging information, in which the presence server returns the presence service access device a response message, including a list of watchers of successful transmission or unsuccessful transmission, after successful transmission of the presence information to the watcher client; and the presence service access device generates an original call detail record and transmits it to a charging center based on the received message.

6. A presence service system comprising:
a presence serve, a presence service access device, and a charging processing module;
wherein the presence service access device is configured to
receive presence information published by a presentity;
verify the presence information based on a predefined mode definition;
acquire routing information from a tandem device, wherein the routing information comprises a correspondence relationship between presence servers and presentities for denoting there is at least one watcher belonging to the presence server which subscribes to the presence information of the presentity, and a correspondence relationship between presence servers and presence service access devices;

determine a presence server that the corresponding watcher to which subscribes the presentity publishing the presence information belongs, based on the correspondence relationship between presence servers and presentities;

determine a corresponding presence service access device, based on the determined presence server and the correspondence relationship between presence servers and presence service access device;

forward the presence information to the determined presence service access device, wherein the determined presence service access device is configured to transmit the presence information passing the verification to the determined presence server;

wherein the presence server is configured to receive and store the presence information transmitted by the determined presence service access device and distribute the presence information to a watcher client; and wherein the charging processing module is configured to receive confirmation information returned by the presence server subsequent to publishing the presence information, generate an original call detail record and a charging record of the presence service based on the confirmation information, and transmit a charging file to a charging center.

7. The system of claim 6, further comprising:

the tandem device configured to interconnect presence service access devices in the presence service system and store routing information, the presence information being forwarded among the presence service access devices based on the routing information.

8. A method for publishing and acquiring presence information, comprising the following steps:

receiving, via the presence service access device, the presence information;

verifying, via the presence service access device, the presence information based on a predefined mode definition;

acquiring, via the presence service access device, routing information from a tandem device, wherein the routing information comprises a correspondence relationship between presence servers and presentities for denoting there is at least one watcher belonging to the presence server which subscribes to the presence information of the presentity, and a correspondence relationship between presence servers and presence service access devices;

determining a presence server that the corresponding watcher to which subscribes the presentity publishing the presence information belongs, based on the correspondence relationship between presence servers and presentities;

determining a corresponding presence service access device, based on the determined presence server and the correspondence relationship between presence servers and presence service access device;

forwarding the presence information to the determined presence service access device;

transmitting, via the determined presence service access device, the presence information passing the verification to the determined presence server;

distributing, via the determined presence server, the presence information to a corresponding watcher client;

generating charging information in which the presence server generates an original call detail record; and transmitting the original call detail record to a charging center after successful information transmission.

9. The method of claim 8, wherein the method further comprises a step of generating charging information in which the presence server generates an original call detail record and transmits the original call detail record to a charging center after successful information transmission.

10. The method of claim 8, wherein the method further comprises a step of generating charging information, in which the presence server returns the presence service access device a response message, including a list of watchers of successful transmission or unsuccessful transmission, after successful transmission of the presence information to the watcher client; and the presence service access device generates an original call detail record and transmits it to a charging center based on the received message.

\* \* \* \* \*